(12) United States Patent
Siessegger et al.

(10) Patent No.: US 10,185,295 B2
(45) Date of Patent: Jan. 22, 2019

(54) DYNAMIC CONTROL OF SWITCHING FREQUENCY IN A SWITCH MODE POWER CONVERTER

(71) Applicants: Bernhard Siessegger, Danvers, MA (US); Saijun Zhang, Tewksbury, MA (US)

(72) Inventors: Bernhard Siessegger, Danvers, MA (US); Saijun Zhang, Tewksbury, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 546 days.

(21) Appl. No.: 14/870,090

(22) Filed: Sep. 30, 2015

(65) Prior Publication Data
US 2017/0093159 A1    Mar. 30, 2017

(51) Int. Cl.
H02J 3/12          (2006.01)
G05B 15/02         (2006.01)
H02M 1/00          (2006.01)

(52) U.S. Cl.
CPC ............. G05B 15/02 (2013.01); H02M 1/00 (2013.01); *H02M 2001/0019* (2013.01); *H02M 2001/0022* (2013.01)

(58) Field of Classification Search
CPC ........................................................ H02J 3/12
See application file for complete search history.

(56) References Cited

U.S. PATENT DOCUMENTS

| 5,327,355 | A | * | 7/1994 | Chiba | G05B 13/0275 |
| | | | | | 700/298 |
| 6,005,377 | A | * | 12/1999 | Chen | H02M 3/157 |
| | | | | | 323/223 |
| 6,069,807 | A | * | 5/2000 | Boylan | H02M 3/33507 |
| | | | | | 323/288 |
| 2006/0152204 | A1 | * | 7/2006 | Maksimovic | H02M 1/38 |
| | | | | | 323/284 |
| 2006/0221646 | A1 | * | 10/2006 | Ye | H02M 3/156 |
| | | | | | 363/13 |
| 2007/0262756 | A1 | * | 11/2007 | Valley | H02J 3/48 |
| | | | | | 323/234 |
| 2008/0094762 | A1 | * | 4/2008 | Ochiai | H02H 3/05 |
| | | | | | 361/24 |
| 2008/0130321 | A1 | * | 6/2008 | Artusi | H02M 1/4225 |
| | | | | | 363/21.01 |

(Continued)

*Primary Examiner* — Victoria K Hall
(74) *Attorney, Agent, or Firm* — Yutian Ling

(57) ABSTRACT

A controller dynamically identifies a switching frequency based power converter output load condition, input voltage, and/or temperature. The controller updates the operating switching frequency to the identified target switching frequency when the identified switching frequency is sufficiently different than a current operating switching frequency of the power converter. In this respect, switching frequency may be dynamically controlled to strike a balance between avoiding saturation of inductive elements and efficient operation of a power converter. A controller may also dynamically control switching frequency by having a thermo resistor incorporated into circuitry that determines switching frequency such that an increase in temperature beyond the threshold temperature directly causes a decrease in switching frequency.

19 Claims, 6 Drawing Sheets

(56) References Cited

U.S. PATENT DOCUMENTS

| | | | | |
|---|---|---|---|---|
| 2008/0130322 A1* | 6/2008 | Artusi | | H02M 1/4225 363/21.01 |
| 2008/0232141 A1* | 9/2008 | Artusi | | H02M 1/4225 363/21.01 |
| 2009/0234600 A1* | 9/2009 | Matsumoto | | G01R 31/343 702/64 |
| 2010/0165667 A1* | 7/2010 | Artusi | | H02M 1/4225 363/21.01 |
| 2010/0213919 A1* | 8/2010 | Takayanagi | | G06F 1/206 323/318 |
| 2011/0101934 A1* | 5/2011 | Lopata | | H02M 3/1588 323/271 |
| 2011/0101948 A1* | 5/2011 | Lopata | | H02M 3/1588 323/283 |
| 2011/0101949 A1* | 5/2011 | Lopata | | H02M 3/1588 323/286 |
| 2011/0194309 A1* | 8/2011 | Gaknoki | | H02M 1/4258 363/21.01 |
| 2012/0153912 A1* | 6/2012 | Demski | | H02M 3/07 323/282 |
| 2012/0154013 A1* | 6/2012 | Mera | | G11C 5/147 327/333 |
| 2014/0009978 A1* | 1/2014 | Brinlee | | H02M 1/4225 363/25 |
| 2014/0091718 A1* | 4/2014 | Brinlee | | H05B 33/0815 315/185 R |
| 2014/0091720 A1* | 4/2014 | Brinlee | | H05B 33/0815 315/186 |
| 2014/0328089 A1* | 11/2014 | Gaknoki | | H02M 1/08 363/21.13 |
| 2015/0098254 A1* | 4/2015 | Brinlee | | H02M 3/3376 363/21.02 |
| 2015/0188468 A1* | 7/2015 | Xu | | H02P 9/007 290/44 |
| 2015/0198634 A1* | 7/2015 | Brinlee | | G01R 31/28 324/72.5 |
| 2015/0333630 A1* | 11/2015 | Pastore | | H02M 3/33507 363/21.17 |
| 2015/0333764 A1* | 11/2015 | Pastore | | H03M 1/68 363/21.12 |
| 2016/0028316 A1* | 1/2016 | Ko | | H02M 3/33507 363/21.12 |
| 2016/0233681 A1* | 8/2016 | Itaya | | H02J 3/12 |
| 2016/0252918 A1* | 9/2016 | Adragna | | H02M 3/156 323/281 |
| 2017/0141572 A1* | 5/2017 | Omi | | H02J 3/12 |

\* cited by examiner

DYNAMIC CONTROL OF SWITCHING FREQUENCY IN A SWITCH MODE POWER CONVERTER

FIELD OF THE DISCLOSURE

This disclosure relates to switching mode power supplies, and more particularly to the dynamic control of switching frequency to reduce power losses and/or to improve converter reliability.

BACKGROUND

Pulse width modulation (PWM) is a technique used to control an amount of electric power and/or the waveform of electric power that is transmitted to a load. One or more switches between a supply of electric power and the load are closed and opened at a high rate, defined by a switching frequency. Power is transmitted over the brief pulses. The duration or "width" of the pulses is controlled to, in turn, control the amount of power that is transmitted by each pulse. Collectively, controlling the amount of power in each pulse enables control of the overall amount of electric power that is transmitted and/or of the shape of the waveform over which the electric power is transmitted. Typically, switching mode power converters operate with a fixed switching frequency. The value of the fixed switching frequency is often set to be high enough to avoid saturation of inductive elements when the power converter is transmitting power near a full load for which the converter is designed. Such switching frequencies are often inefficient when used to transmit electric power at less than full load.

Some conventional power converters have two distinct switching frequencies, including a full power mode switching frequency and a burst mode switching frequency that is less than the full power mode switching frequency. The full power mode switching frequency is used under normal operating conditions. When a controller detects that the load is substantially less than the full design load (a threshold typically set by the designer), the burst switching mode is used to reduce power losses.

Other conventional approaches alter the switching frequency or disable output from a power converter when an operating temperature exceeds a threshold level temperature.

These and other features of the present embodiments will be understood better by reading the following detailed description, taken together with the figures herein described. The accompanying drawings are not intended to be drawn to scale.

DETAILED DESCRIPTION OF THE DRAWINGS

Techniques are disclosed herein for dynamically controlling a switching frequency in a pulse width modulated (PWM) power converter or other switching mode power supply, such as an LED power supply. One embodiment provides a controller that dynamically identifies a target switching frequency based on power converter output condition (e.g., output current (Iout) and/or output voltage (Vout)) and input voltage (Vin). The controller updates the operating switching frequency to the identified target switching frequency when the target switching frequency is sufficiently different than a current operating switching frequency of the power converter. In this respect, switching frequency may be dynamically controlled to strike an optimum or otherwise suitable balance between avoiding saturation of inductive elements and efficient operation of a power converter.

Another embodiment provides a controller that dynamically reduces switching frequency when temperature exceeds a threshold temperature. The controller includes a thermo resistor—either a PTC or NTC resistor—incorporated into circuitry that determines switching frequency such that an increase in temperature beyond the threshold temperature directly causes a decrease in switching frequency. According to another embodiment, a signal is provided to a controller by a thermo resistor when the threshold temperature is exceeded. The controller then acts to reduce the switching frequency of the power converter.

Numerous embodiments and variations will be apparent in light of this disclosure, including combination of the above-mentioned embodiment, such as the case where switching frequency is dynamically adjusted based on a combination of two or more of Vin, Vout, Iout, and temperature).

Dynamic Control Based on Multiple Operating Parameters

Figure 1:
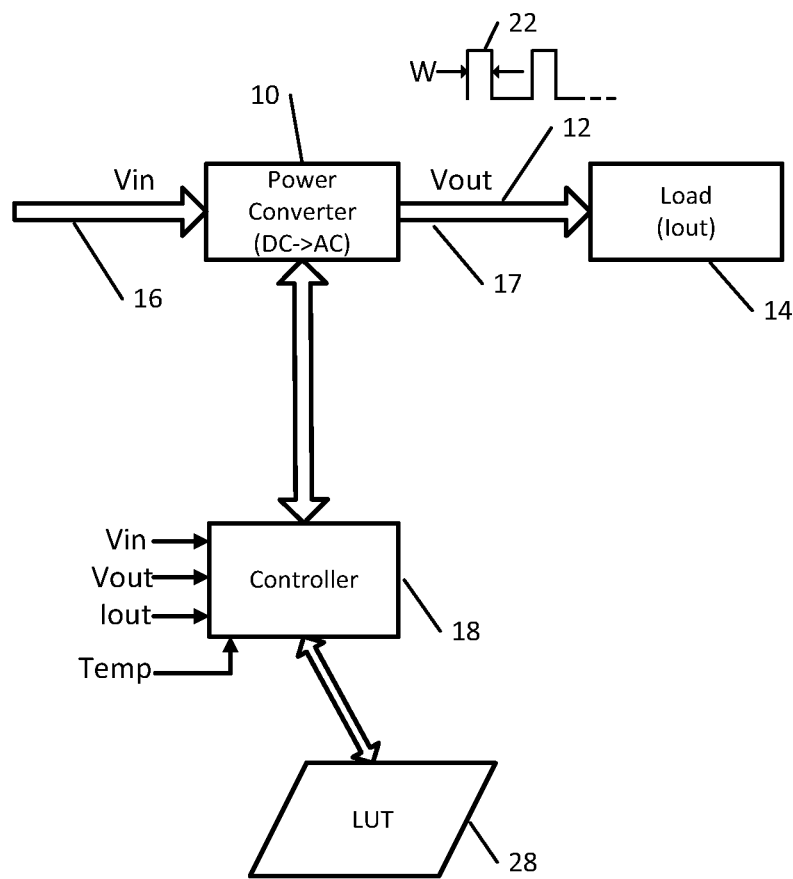
FIG. 1 is a schematic representation of a pulse width modulated power converter used to control electrical power that is provided to a load, according to one embodiment of the present disclosure.

Turn now to the figures and initially FIG. 1 that shows a power converter 10 transmitting electric power 12 to a load 14. In the illustrated embodiment, electric power is converted from a received waveform 16 that is direct current (DC) to a transmitted waveform 17 that is alternating current (AC) through pulse width modulation techniques. The amount of power transmitted to the load 14 is also controlled. It is to be appreciated that the example embodiment of FIG. 1 is simplified for purposes of illustration and discussion, and that other embodiments include other devices and methods that utilize pulse width modulation or other switching mode power conversion techniques for other purposes, including conversion of AC electric power to DC electric power, DC electric power to DC electric power, AC electric power to AC electric power, control of a waveform without altering an amount of power, and the like. It is also to be appreciated that the term "converter" as used herein with respect to switching mode power conversion refers to a device that utilizes a switching frequency to transmit electric power, regardless of whether the waveform and/or amount of power are altered during transmission.

A controller 18, as also illustrated in FIG. 1, determines the width W of each pulse 22 that collectively form the electric waveform 12 transmitted by the converter 10. The controller 18 also controls the frequency of the pulses, or equivalently, the "switching frequency" at which the converter 10 actuates switches that close and open to create the pulses 22. As discussed herein, switching frequency is conventionally set to a single, consistent or otherwise fixed value that is chosen to prevent magnetic saturation when power is transmitted at full load or near an otherwise maximum designed capacity. In general, the higher the switching frequency, the higher the resulting switching and gate driver power losses. As will be appreciated in light of this disclosure, however, the switching frequency at lower load conditions can be reduced without causing the saturation issue and hence switching and gate driver power losses can be saved.

As can be further seen with reference to FIG. 1, the controller 18 receives input that includes output current (Iout) or equivalently output load 14, input voltage (Vin) of the received waveform 16, and output voltage (Vout) of the transmitted waveform 12, according to some embodiments. In still other embodiments, further note that the controller 18 alternatively, or additionally, receives input that includes an indication of temperature (Temp), as will be explained in greater detail with reference to FIGS. 3-6. Two or more of these inputs are used by the controller 18 to determine the switching frequency used in operation by the power converter 10, in accordance with an embodiment. Generally speaking, higher loads and voltages utilize higher switching frequencies to prevent saturation while lower loads and voltages utilize lower switching frequencies to improve efficiency.

The controller 18 may utilize different control techniques to identify an update switching frequency at which the converter 10 is to operate. According to one embodiment, the controller 18 includes a look-up-table 28 having data that includes optimal switching frequencies for different input, such as combinations of input voltage and load conditions (e.g., output load current and/or and output voltage). The controller interrogates the look-up-table (LUT) 28 to identify an update switching frequency. Depending on the embodiment, the controller may determine whether to implement the updated switching frequency based on additional logic.

Switching frequencies included in the look-up-table 28 may be determined through various approaches, as will be appreciated in light of this disclosure. According to some embodiments, switching frequencies are identified that optimize between different factors for various values or ranges of values of output current (equivalently, output load), input voltage, and output voltage. The factors against which switching frequencies can be optimized include, for instance, efficient operation, avoidance of saturation, and the like. Optimizations may be made analytically and/or empirically. Values of the look-up-table may be updated, either manually or automatically, as information on optimization is acquired through use, according to some embodiments. Table 1 illustrates an example one look-up-table 28 that could be used in accordance with one embodiment. As can be seen, once two or more of the look-up parameters (Vin, Vout, and Iout) are known, a corresponding target switching frequency can be identified that is suitable for those parameters for a given application. As will be further appreciated in light of this disclosure, the resolution of the look-up table 28, including the number of entries and the size of ranges provided for the various parameters (Vin, Vout, and Iout) corresponding to a given target switching frequency, can be set as desired depending on factors for the given application, such as desired accuracy and precision of the switching frequency to be selected. Countless other example LUTs will be apparent.

TABLE 1

Example LUT

| Vin | Vout | Iout | Target Switching Frequency |
|---|---|---|---|
| 4 to 5 VDC | 1 to 2 VAC | 0.25 to 0.50 A | 95 KHz |
| 4 to 5 VDC | 1 to 2 VAC | 0.5 to 0.75 A | 110 KHz |
| 4 to 5 VDC | 1 to 2 VAC | 0.75 to 0.95 A | 125 KHz |
| 4 to 5 VDC | 2 to 3 VAC | 0.25 to 0.50 A | 95 KHz |
| 4 to 5 VDC | 2 to 3 VAC | 0.50 to 0.75 A | 110 KHz |
| 4 to 5 VDC | 2 to 3 VAC | 0.75 to 0.95 A | 125 KHz |
| 4 to 5 VDC | 3 to 4 VAC | 0.95 to 1.25 A | 145 KHz |
| 4 to 5 VDC | 3 to 4 VAC | 1.25 to 1.75 A | 180 KHz |
| 4 to 5 VDC | 3 to 4 VAC | 1.75 to 2.00 A | 210 KHz |

The controller 18 may interrogate the look-up-table 28 to determine an optimal switching frequency according to different approaches. This interrogation may be initiated based on criteria that differ for various embodiments. According to some embodiments, the look-up-table 28 is interrogated at regular timing intervals. The look-up-table 28 may, additionally or alternately, be interrogated when a change in operational characteristics of the converter 10 is detected. Such changes include but are not limited to changes in load (Iout), input voltage (Vin), output voltage (Vout), and operational temperature of the converter.

Look-up-table 28 may include data for numerous operating conditions and corresponding switching frequencies. In this respect, operation of the power converter 10 may be tailored, depending on the application, for dynamic control of switching frequency over a wide range of operating conditions. According to some embodiments, the look-up-table 28 includes at least 3 different switching frequencies and corresponding combinations of ranges of output load, input voltage, and/or output voltage for each switching frequency. It is to be appreciated that the number of switching frequencies may be greater than three, including up to 10 or more, 20 or more, 50 or more, 100 or more, or even greater numbers as the embodiments described herein are not limited in this respect.

The controller 18 may include logic to determine when and/or whether to replace the current operational switching frequency with an update switching frequency that has been identified as optimal or otherwise suitable for current operating conditions. According to some embodiments, an updated switching frequency is identified for current operating parameters of a controller according to a timing schedule. The updated switching frequency is then compared with the current operational switching frequency to determine a difference therebetween. In some such embodiments, if the difference is greater than a predefined threshold, the controller replaces the switching frequency with the updated switching frequency; otherwise no action is taken at that time to alter the switching frequency. The threshold difference may be, for example, 1% or greater, 2% or greater, 3% or greater, 5% or greater, 7.5% or greater, 10% or greater, or other values as, as embodiments are not limited to the values specifically recited herein.

Methodology for Dynamic Control Based on Multiple Operating Parameters

Figure 2:
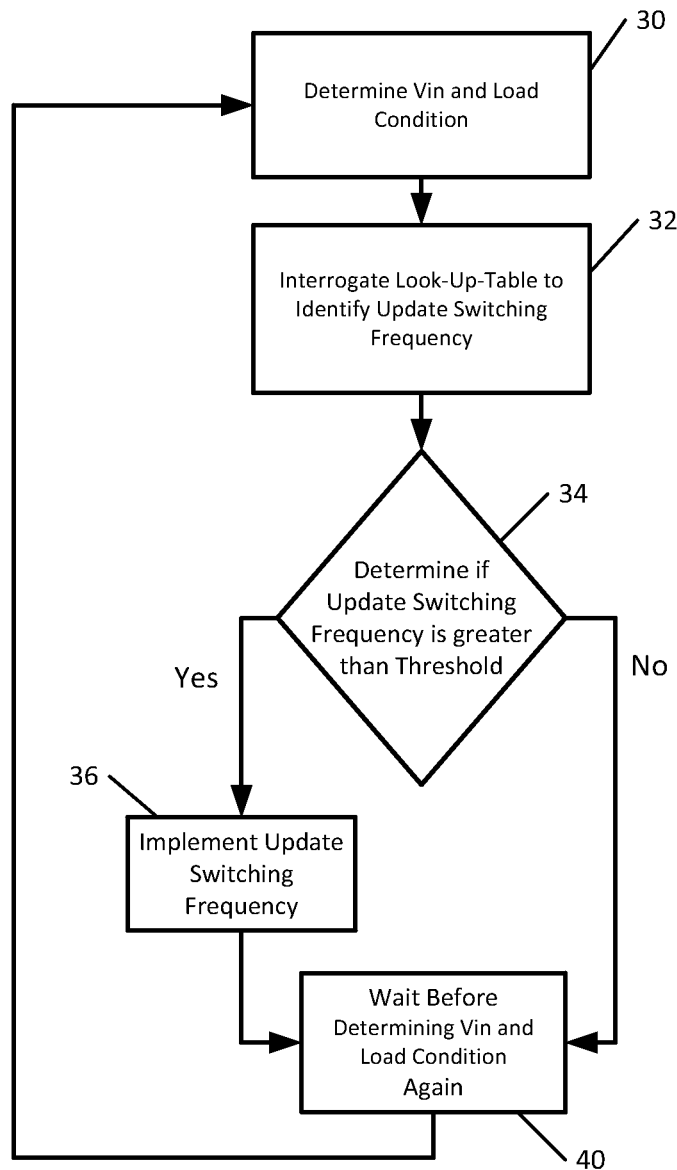
FIG. 2 is a flow chart, showing logic used to dynamically control switching frequency of a switching mode power converter according to output load information, input voltage information, and output voltage information, according to one embodiment of the present disclosure.

FIG. 2 shows a flowchart of logic used to dynamically control a power converter based on multiple operating parameters, according to one embodiment. As shown, a controller operates 30 on a combination of information that includes input voltage (Vin), and output load condition, as may be determined by determining load current (Iload), and output voltage (Vout), according to some embodiments. It is to be appreciated that output load condition may be determined according to other approaches, including an approach that determines the output load condition by determining load current and load voltage. The controller interrogates 32 a look-up-table to identify an updated switching frequency for the output load condition and input voltage of the power converter, according to an example embodiment. A determination 34 is then made as to whether the updated switching frequency is greater than a threshold difference with respect to the switching frequency currently used by the power converter. If the threshold difference is exceeded, the controller implements 36 the updated switching frequency. If the threshold difference is not exceeded, the controller may not implement the update switching frequency but rather may maintain the current switching frequency. The controller may wait a specified time 40 before determining input voltage and load condition another time.

Dynamic Control Including a Thermo Resistor

As discussed herein, converters operating at higher switching frequencies tend to produce greater amounts of heat from higher switching and gate driver losses. As the heat accumulates, the temperature of converter components may rise to a point that can impair reliability and/or cause converter damage. According to some embodiments of the present disclosure, a thermo resistor is used to reduce switching frequency of a converter when temperature reaches a point that may be deleterious to operation. In some such cases, the sensed temperature parameter can be used in conjunction with other parameters, such as Vin, Vout, and/or Iout, as will be appreciated in light of this disclosure.

A thermo resistor may be incorporated directly into a circuit of a converter that determines switching frequency. The circuit may be configured such that the circuit directly alters the switching frequency of the converter by virtue of a changing resistance value of the thermo resistor. In this respect, a converter may be safeguarded against thermal damage in a relatively low cost manner.

Figure 3:
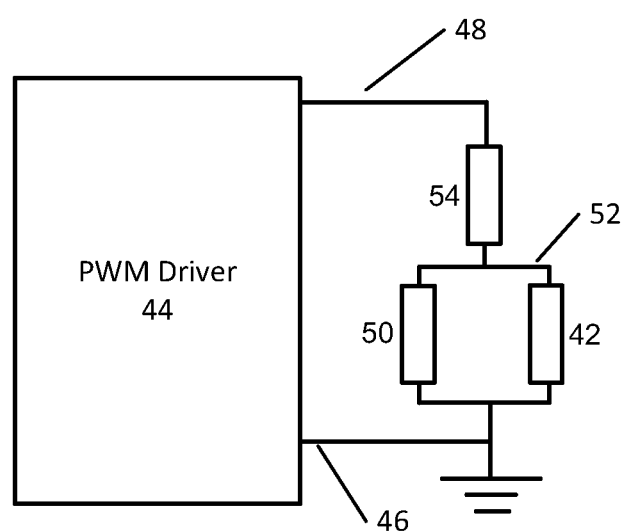
FIG. 3 is a schematic representation of a circuit that controls switching frequency in a switching mode power converter and that includes a thermo resistor, according to one embodiment of the present disclosure.

FIG. 3 shows one embodiment in which a thermo resistor 42 is incorporated into a circuit that determines switching frequency for a converter. The PWM driver 44 includes an oscillator that sets switching frequency of the driver based on a resistance value between an analog ground 46 and a frequency control input terminal 48. One example of such a driver is the LM5035A driver as may be acquired from National Semiconductor of Lewisville, Tex. The thermo resistor 42, can be implemented, for example, with a Positive Temperature Coefficient (PTC) thermistor having a resistance that rises markedly at a threshold temperature. As can be further seen in this example case, the thermo resistor 42 is placed in parallel with another resistor 50 in a resistor network 52. The network 52 also includes a serially-connected resistor 54 that establishes a minimum resistance value for the overall resistor network 52.

Figure 4:
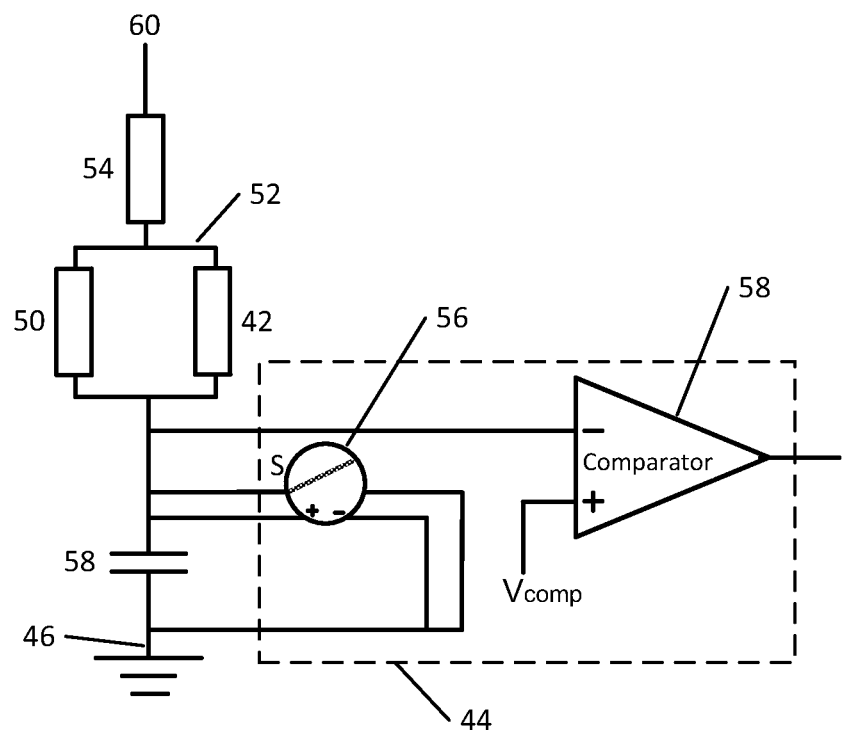
FIG. 4 is a schematic representation of a circuit that controls switching frequency in a switching mode power converter and that includes a thermo resistor, according to another embodiment of the present disclosure.

FIG. 4 shows a thermo resistor 42 incorporated into a circuit, such as that of FIG. 3, but with a more details of components that may be included within a PWM driver 44, in accordance with an embodiment. As shown, a power management circuit 54 includes a voltage controlled switch (S) 56 and a PWM comparator 58. The power management circuit 54 is operatively connected to an RC circuit that includes the resistor network 52 (including the parallel connection of thermo resistor 42 and resistor 50) and a capacitor 58 that are connected in series between ground terminal 46 and a voltage terminal 60. The RC circuit, in connection with ground 46 and the voltage 60, define the switching frequency used by the power management circuit 44 in driving a given load. The thermo resistor network 52 acts in a similar manner to that of the embodiment shown in FIG. 3, in that resistance increases with an increase in temperature beyond a threshold value. The increased resistance causes a reduction in the switching frequency, as determined by the RC circuit when temperature passes one or more threshold values.

Figure 5:
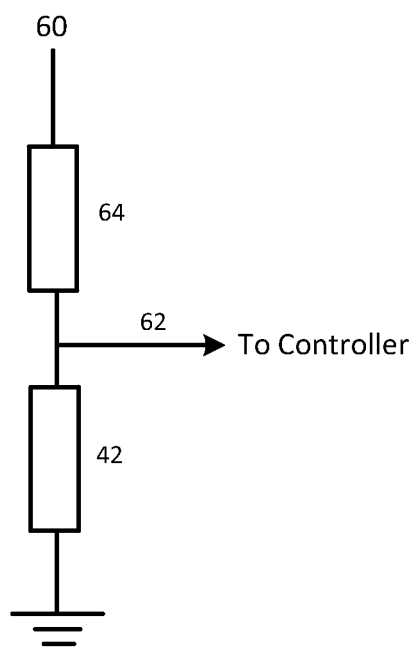
FIG. 5 is a schematic representation of a thermo resistor that provides a signal to a controller for controlling switching frequency of a switching mode power converter, according to one embodiment of the present disclosure.

FIG. 5 shows another embodiment that dynamically controls switching frequency through the use of a thermo resistor 42 that may be placed in series with another resistor 64. As can be further seen, this resistive divider is biased between ground and voltage 60, and an output signal 62 is provided to a controller. The controller, treating the signal 62 from the thermo resistor 42 as an input, is then able to identify a reduced switching frequency for the converter through a look-up-table, feedback loop, or the like. The controller may then implement the reduced switching frequency to reduce the amount of heat generated by the converter.

Different types of thermo resistors may be used in embodiments associated with FIG. 5. By way of example, either NTC or PTC type thermo resistors are used according to some embodiments, as each exhibit resistance values that change with changes in temperatures. Such changes in resistance result in changes in voltage and/or current associated with the thermo resistor that may be used as input to a controller.

The controller may change the switching frequency after a threshold difference between a previously measured temperature and the presently measured temperature is exceeded. In this respect, any disruptions or operational inefficiencies associated with changing switching frequency may be minimized or otherwise reduced. It is to be appreciated that threshold difference may be expressed within the logic of a controller in various terms, including but not limited to a difference in temperature, a difference in voltage across a thermo resistor or resistor network, or a difference in the switching frequency that would be commanded by the controller.

The threshold difference may have different values. According to some embodiments, the threshold value is associated with a 5% difference in the switching frequency, although differences are also contemplated include 1%, 2.5%, 10%, and 15% differences to name a few. The threshold differences may alternately be expressed in terms of other variables, such as a difference in temperature, voltage, and current, among other possibilities, as the specific descriptions herein are non-limiting in this respect.

The controller may assess whether an update switching frequency is to be implemented according to a regular schedule or a detected change in operating conditions, for example. In such embodiments, the controller measures temperature, as indicated by the thermo resistor, according to a regular schedule and then makes a comparison against the threshold value. This process is repeated throughout operation of the converter. According to other embodiments, the thermo resistor is monitored to determine the extent of any temperature change. When temperature change is detected, the controller than determines whether the threshold difference is exceeded and implements a change to the switching frequency accordingly. Once a change to the switching frequency is implemented, the controller may wait a specified time before any further changes are made to the switching frequency.

Methodology for Dynamic Control Including a Thermo Resistor

Figure 6:
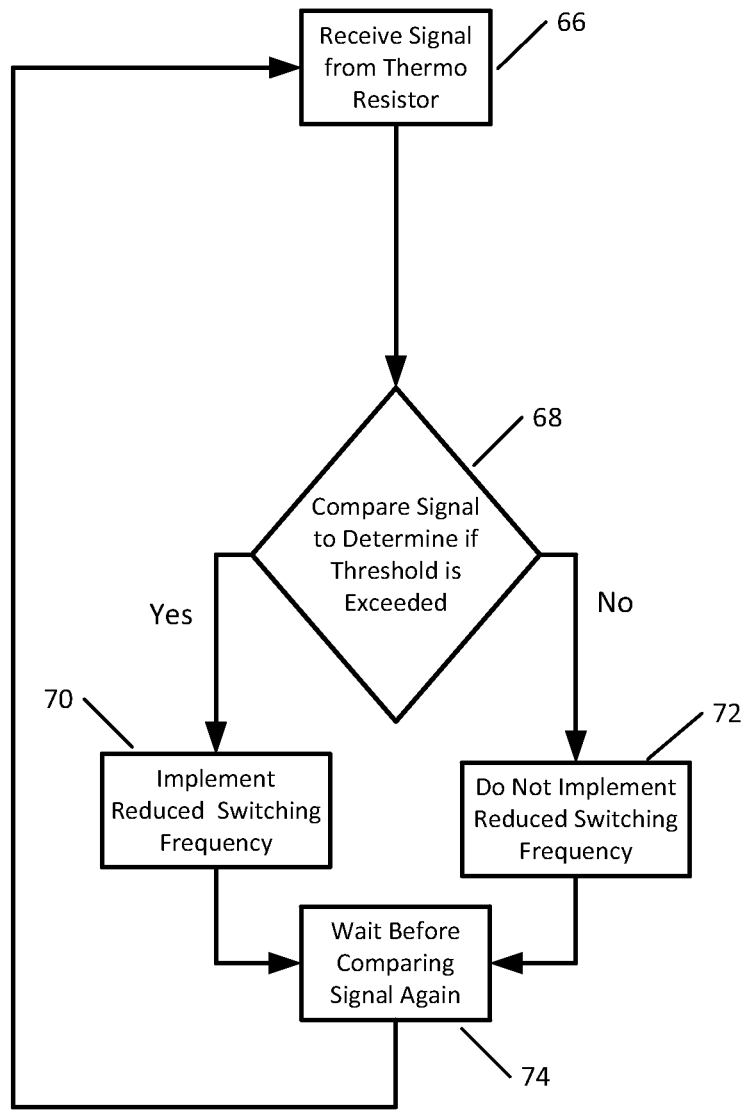
FIG. 6 is a flow chart, showing logic used to dynamically control switching frequency of a switching mode power converter according a signal received from a thermo resistor, such as in the embodiment of FIG. 5.

FIG. 6 shows a flowchart of logic used to dynamically control a power converter with input from a thermo resistor, according to one embodiment. As shown, a controller operates on information that includes a signal received 66 from a thermo resistor network operatively connected to the converter. A comparison 68 is made to determine if the temperature of the converter exceeds a threshold value, and if so, the switching frequency of the converter is reduced 70. If the threshold value is not exceeded, then the controller does not alter 72 the switching frequency. The controller then waits 74 a specified time before making another comparison.

Numerous embodiments will be apparent in light of this disclosure. One example embodiment provides a method of controlling a switching frequency of a switch mode power converter. The method includes receiving input voltage information and at least one of output voltage information and output load current information of a power converter operating at a switching frequency and load. An updated switching frequency is identified based on the input voltage information and the at least one of output voltage information and output load current information of the power converter. The switching frequency is changed to the updated switching frequency. In some embodiments, identifying the updated switching frequency includes interrogating a look-up-table of switching frequencies for input voltage information and at least one of output load current information and output voltage information of the power converter. The look-up-table includes switching frequencies identified through optimizing between efficiency and avoidance of magnetic saturation of the power converter for different combinations, input voltage information and at least one of output load current information and output voltage information of the power converter, according to some embodiments. According to many embodiments, the table of switching frequencies includes three or more switching frequencies. A difference may be identified between the switching frequency and the updated switching frequency and changing the switching frequency to the updated switching frequency when the difference exceeds a threshold difference in some embodiments. The threshold difference is greater than five percent of the switching frequency, according to some embodiments. Identifying an updated switching frequency is further based on an indication of a change in temperature, in some embodiments.

According to another example embodiment, an apparatus is disclosed for controlling a switching frequency of a switch mode power converter. The apparatus includes at least one processor and at least one processor-readable storage medium having encoded thereon executable instructions that, when executed by the at least one processor, cause the at least one processor to carry out a process that includes receiving output load information, input voltage information, and output voltage information of a power converter operable at a switching frequency and load. The process also includes identifying an updated switching frequency based on at least two of the output current information, the input voltage information, and the output voltage information of the power converter and changing the switching frequency to the updated switching frequency. Identifying an updated switching frequency, according to some embodiments, includes interrogating a look-up-table of switching frequencies for at least two of output load information, input voltage information, and output voltage information of the power converter. The table of switching frequencies includes three or more switching frequencies, according to some embodiments. The process may further include identifying a difference between the switching frequency and the updated switching frequency and changing the switching frequency to the updated switching frequency that occurs in response to the difference exceeding a threshold difference, in some embodiments. The threshold difference is greater than five percent of the switching frequency, according to some embodiments. Identifying an updated switching frequency is further based on an indication of a change in temperature, according to some embodiments. The indication of a change in temperature, according to some embodiments, is provided by a resistive network including a thermo resistor. A thermo resistor forms at least a part of an RC circuit that determines the switching frequency, where the thermo resistor is configured in the RC circuit such that a rise in resistance of the thermo resistor causes a reduction of the switching frequency, according to some embodiments. The thermo resistor may be a PTC thermo resistor.

According to yet another example embodiment, an apparatus is disclosed for controlling switching frequency of a switch mode power converter. The apparatus includes a power management integrated circuit configured to regulate switching frequency and voltage of the power converter. An RC circuit is externally coupled to the power management integrated circuit and that includes a thermo resistor having a resistance that, at least in part, determines the switching frequency of the power converter. The resistance of the thermo resistor increases when a threshold temperature at the thermo resistor is exceeded, causing a reduction in the switching frequency of the power converter. According to some embodiments, the thermo resistor is a PTC thermo resistor. The switching frequency of the power converter is further determined based on at least one of the output load, the input voltage, and the output voltage of the power converter, according to some embodiments. The switching frequency of the power converter is further determined based on the output load, the input voltage, and the output voltage of the power converter, in some embodiments.

The above-described embodiments that include controllers can be implemented in any of numerous ways. For example, the embodiments may be implemented using hardware, software or a combination thereof. When implemented in software, the software code may be executed on any suitable processor or collection of processors, whether provided in a single controller or distributed among multiple controllers.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various concepts may be embodied as at least one non-transitory computer/controller readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments described herein. The non-transitory computer-readable medium or media may be transportable, such that the program or programs stored thereon may be loaded onto any computer resource to implement various aspects of the embodiments as discussed above.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

All definitions, as defined and used herein, should be understood to control over dictionary definitions, definitions in documents incorporated by reference, and/or ordinary meanings of the defined terms.

Having described several embodiments in detail, various modifications and improvements will readily occur to those skilled in the art. Such modifications and improvements are intended to be within the spirit and scope of this disclosure. Accordingly, the foregoing description is by way of example only, and is not intended as limiting. The embodiments are limited only as defined by the following claims and the equivalents thereto.

The invention claimed is:

1. A method of controlling a switching frequency of a switch mode power converter, the method comprising:
    receiving, at a processor, input voltage information and at least one of output voltage information and output load current information of a power converter operating at a switching frequency and load;
    identifying, by the processor and an RC circuit coupled to the processor, an updated switching frequency based on the input voltage information and the at least one of output voltage information and output load current information of the power converter, wherein a thermo resistor forms at least a part of the RC circuit that determines the switching frequency; and
    changing, by the processor, the switching frequency to the updated switching frequency.

2. The method of claim 1, wherein identifying the updated switching frequency includes interrogating, by the processor, a look-up-table of switching frequencies for input voltage information, and at least one of output voltage information and/or output load current information of the power converter.

3. The method of claim 2, wherein the look-up-table includes switching frequencies identified through optimizing between efficiency and avoidance of magnetic saturation of the inductive elements in the power converter for different combinations of input voltage information and at least one of output voltage information and output load current information of the power converter.

4. The method of claim 2, wherein the table of switching frequencies includes three or more switching frequencies.

5. The method of claim 2, further comprising:
    identifying, by the processor, a difference between the switching frequency and the updated switching frequency and changing the switching frequency to the updated switching frequency when the difference exceeds a threshold difference.

6. The method of claim 5, wherein the threshold difference is greater than five percent of the switching frequency.

7. The method of claim 1, wherein identifying an updated switching frequency is further based on an indication of a change in temperature.

8. An apparatus for controlling a switching frequency of a switch mode power converter, comprising:
    at least one processor; and
    at least one processor-readable storage medium having encoded thereon executable instructions that, when executed by the at least one processor, cause the at least one processor to carry out a process that includes:
        receiving at least two of output load current information, input voltage information, and output voltage information of a power converter operable at a switching frequency and load;
        identifying an updated switching frequency based on at least two of the output load current information, the input voltage information, and the output voltage information of the power converter, wherein a thermo resistor forms at least a part of an RC circuit that determines the switching frequency; and
        changing the switching frequency to the updated switching frequency.

9. The apparatus of claim 8, wherein the identifying an updated switching frequency includes interrogating a look-up-table of switching frequencies for at least two of output load current information, output voltage information, and input voltage information of the power converter.

10. The apparatus of claim 9, wherein the look-up-table of switching frequencies includes three or more switching frequencies.

11. The apparatus of claim 8, wherein the process further includes identifying a difference between the switching frequency and the updated switching frequency and changing the switching frequency to the updated switching frequency occurs in response to the difference exceeding a threshold difference.

12. The apparatus of claim 11, wherein the threshold difference is greater than five percent of the switching frequency.

13. The apparatus of claim 8, wherein identifying an updated switching frequency is further based on an indication of a change in temperature.

14. The apparatus of claim 13, wherein the indication of a change in temperature is provided by a resistive network including the thermo resistor.

15. The apparatus of claim 14, wherein the thermo resistor is a PTC thermo resistor.

16. An apparatus for controlling switching frequency of a switch mode power converter, comprising:
    a power management integrated circuit configured to regulate switching frequency; and
    an RC circuit externally coupled to the power management integrated circuit and that includes a thermo resistor having a resistance that, at least in part, determines the switching frequency of the power converter;
    wherein temperature increase of the resistance of the thermo resistor beyond a threshold temperature causes a reduction in the switching frequency of the power converter.

17. The apparatus of claim 16, wherein the thermo resistor is a PTC thermo resistor.

18. The apparatus of claim 16, wherein the switching frequency of the power converter is further determined based on at least one of the output load current, the input voltage, and the output voltage of the power converter.

19. The apparatus of claim 16, wherein the switching frequency of the power converter is further determined based on the output load current, the input voltage, and the output voltage of the power converter.

\* \* \* \* \*